(12) United States Patent
Yoo et al.

(10) Patent No.: US 10,608,253 B2
(45) Date of Patent: Mar. 31, 2020

(54) LITHIUM SECONDARY BATTERY AND METHOD OF FABRICATING THE SAME

(71) Applicant: SK Innovation Co., Ltd., Seoul (KR)

(72) Inventors: Kyung Bin Yoo, Daejeon (KR); Kook Hyun Han, Daejeon (KR); Duck Chul Hwang, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 0 days.

(21) Appl. No.: 16/257,902

(22) Filed: Jan. 25, 2019

(65) Prior Publication Data
US 2019/0157674 A1    May 23, 2019

Related U.S. Application Data

(63) Continuation of application No. 15/815,813, filed on Nov. 17, 2017, now Pat. No. 10,199,650.

(30) Foreign Application Priority Data

Nov. 18, 2016  (KR) .................. 10-2016-0154284
Sep. 19, 2017  (KR) .................. 10-2017-0120353

(51) Int. Cl.
*H01M 4/00* (2006.01)
*H01M 4/525* (2010.01)
(Continued)

(52) U.S. Cl.
CPC ......... *H01M 4/525* (2013.01); *H01M 2/0285* (2013.01); *H01M 2/0292* (2013.01); *H01M 4/0404* (2013.01); *H01M 4/0435* (2013.01); *H01M 4/131* (2013.01); *H01M 4/136* (2013.01); *H01M 4/505* (2013.01); *H01M 4/625* (2013.01);
(Continued)

(58) Field of Classification Search
CPC ........... H01M 2/0285; H01M 10/0565; H01M 10/0525; H01M 4/625; H01M 2300/0082
See application file for complete search history.

(56) References Cited

U.S. PATENT DOCUMENTS

2010/0081055 A1* 4/2010 Konishi ................ H01M 4/364
  429/223
2012/0009476 A1* 1/2012 Park ..................... H01M 4/131
  429/223

(Continued)

FOREIGN PATENT DOCUMENTS

KR     1020170093085 A    8/2017

*Primary Examiner* — Cynthia H Kelly
*Assistant Examiner* — Monique M Wills
(74) *Attorney, Agent, or Firm* — The Webb Law Firm (57) ABSTRACT

A lithium secondary battery includes a cathode formed from a cathode active material including a first cathode active material particle and a second cathode active material particle, an anode and a separator interposed between the cathode and the anode. The first cathode active material particle includes a lithium metal oxide including a continuous concentration gradient in at least one region between a central portion and a surface portion. The second cathode active material particle includes a lithium metal oxide including at least two metals except for lithium which have constant concentrations from a central portion to a surface, and the second cathode active material particle includes an excess amount of nickel among the metals except for lithium.

14 Claims, 3 Drawing Sheets

(51) Int. Cl.
*H01M 4/131* (2010.01)
*H01M 4/505* (2010.01)
*H01M 2/02* (2006.01)
*H01M 4/04* (2006.01)
*H01M 4/136* (2010.01)
*H01M 4/62* (2006.01)
*H01M 10/0525* (2010.01)
*H01M 10/0565* (2010.01)

(52) U.S. Cl.
CPC ... *H01M 10/0525* (2013.01); *H01M 10/0565* (2013.01); *H01M 2300/0082* (2013.01)

(56) References Cited

U.S. PATENT DOCUMENTS

2016/0260965 A1* 9/2016 Wu .................. H01M 4/139
2017/0077496 A1 3/2017 Liu et al.

* cited by examiner

LITHIUM SECONDARY BATTERY AND METHOD OF FABRICATING THE SAME

CROSS-REFERENCE TO RELATED APPLICATIONS

This application is a continuation of U.S. application Ser. No. 15/815,813, filed Nov. 17, 2017, which claims priority to Korean Patent Application Nos. 10-2016-0154284 and 10-2017-0120353, filed Nov. 18, 2016 and Sep. 19, 2017, respectively, the disclosures of each are hereby incorporated by reference in their entireties.

BACKGROUND

1. Field

The present invention relates to a lithium secondary battery and a method of fabricating the same. More particularly, the present invention relates to a lithium secondary battery including a lithium metal oxide and a method of fabricating the same.

2. Description of the Related Art

A secondary battery which can be charged and discharged repeatedly has been widely employed as a power source of a mobile electronic device such as a camcorder, a mobile phone, a laptop computer, etc., according to developments of information and display technologies. Recently, a battery pack including the secondary battery is being developed and applied as a power source of an eco-friendly vehicle such as a hybrid automobile.

The secondary battery includes, e.g., a lithium secondary battery, a nickel-cadmium battery, a nickel-hydrogen battery, etc. The lithium secondary battery is highlighted due to high operational voltage and energy density per unit weight, a high charging rate, a compact dimension, etc.

For example, the lithium secondary battery may include an electrode assembly including a cathode, an anode and a separation layer, and an electrolyte immersing the electrode assembly. The lithium secondary battery may further include an outer case having, e.g., a pouch shape.

A lithium metal oxide may be used as a cathode active material of the lithium secondary battery preferably having high capacity, power and life-time. Further, a stability of the lithium secondary battery or the cathode active material under a harsh condition at a high temperature or a low temperature is also required as an industrial application of the lithium secondary battery is expanded. Additionally, when the lithium secondary battery or the cathode active material is penetrated by an external object, a resistance with respect to failures such as a short-circuit, an ignition or an explosion may be also needed.

However, the cathode active material having all of the above-mentioned properties may not be easily achieved. For example, Korean Publication of Patent Application No. 10-2017-0093085 discloses a cathode active material including a transition metal compound and an ion adsorbing binder which may not have sufficient life-time and stability.

SUMMARY

According to an aspect of the present invention, there is provided a lithium secondary battery having improved electrical and mechanical reliability and stability.

According to an aspect of the present invention, there is provided a method of fabricating a lithium secondary battery having improved electrical and mechanical reliability and stability.

According to example embodiments, a lithium secondary battery comprises a cathode formed from a cathode active material including a first cathode active material particle and a second cathode active material particle, an anode, and a separator interposed between the cathode and the anode. The first cathode active material particle includes a lithium metal oxide including a continuous concentration gradient in at least one region between a central portion and a surface portion. The second cathode active material particle includes a lithium metal oxide including at least two metals except for lithium which have constant concentrations from a central portion to a surface, and the second cathode active material particle includes an excess amount of nickel among the metals except for lithium.

In some embodiments, the first cathode active material particle may a first metal having a continuously decreasing concentration between the central portion and the surface portion, and a second metal having a continuously increasing concentration between the central portion and the surface portion.

In some embodiments, the first cathode active material particle may further include a third metal having a constant concentration from the central portion to the surface portion.

In some embodiments, the first cathode active material particle may be represented by the following Chemical Formula 1.

[Chemical Formula 1]

In the Chemical Formula 1 above, M1, M2 and M3 may each represent the first metal, the second metal and the third metal, and may be selected from Ni, Co, Mn, Na, Mg, Ca, Ti, V, Cr, Cu, Zn, Ge, Sr, Ag, Ba, Zr, Nb, Mo, Al, Ga or B, and $0<x\leq1.1$, $2\leq y\leq2.02$, $0<a<1$, $0<b<1$, $0<c<1$, and $0<a+b+c\leq1$.

In some embodiments, $0.6\leq a\leq0.95$ and $0.05\leq b+c\leq0.4$ in the Chemical Formula 1.

In some embodiments, $0.7\leq a\leq0.9$ and $0.1\leq b+c\leq0.3$ in the Chemical Formula 1.

In some embodiments, the first metal may be nickel (Ni), the second metal may be manganese (Mn) and the third metal may be cobalt (Co).

In some embodiments, the first cathode active material particle may include a concentration gradient layer formed between the central portion and the surface portion.

In some embodiments, the concentration gradient layer may include a continuous concentration gradient. The central portion and the surface portion may each have a constant concentration composition, and the central portion and the surface portion may have different concentration compositions from each other through the concentration gradient layer.

In some embodiments, the first cathode active material particle may have the continuous concentration gradient throughout an entire region from the central portion to a surface thereof.

In some embodiments, the second cathode active material particle may be represented by the following Chemical Formula 2.

[Chemical Formula 2]

In the Chemical Formula 2 above, M1' may be nickel, and M2' and M3' may be selected from Co, Mn, Na, Mg, Ca, Ti, V, Cr, Cu, Zn, Ge, Sr, Ag, Ba, Zr, Nb, Mo, Al, Ga, W or B, and 0<x≤1.1, 2≤y≤2.02, 0<a+b+c≤1, 0.48≤a≤0.52 0.18≤b≤0.22 and 0.28≤c≤0.32.

In some embodiments, 0.49≤a≤0.51, 0.19≤b≤0.21 and 0.29≤c≤0.31 in the Chemical Formula 2.

In some embodiments, M2' and M3' may be cobalt (Co) and manganese (Mn), respectively.

In some embodiments, a molar ratio of nickel, cobalt and manganese in the second cathode active material particle may be 5:2:3.

In some embodiments, a blending ratio of the first cathode active material particle and the second cathode active material particle may be in a range from 7:3 to 1:9.

In some embodiments, a blending ratio of the first cathode active material particle and the second cathode active material particle may be in a range from 5:5 to 1:9.

In some embodiments, an average diameter ($D_{50}$) of the second cathode active material particle may be in a range from 3 μm to 15 μm.

In some embodiments, an average diameter ($D_{50}$) of the second cathode active material particle may be in a range from 4.5 μm to 15 μm.

According to example embodiments as described above, a cathode active material of a lithium secondary battery may include a first cathode active material particle having a concentration gradient, and a second cathode active material particle having a fixed concentration profile. High capacity and power of the lithium secondary battery may be realized by the first cathode active material particle, and penetration stability and thermal stability of the lithium secondary battery may be obtained by the second cathode active material particle.

Therefore, both electrical performance and mechanical stability of the lithium secondary battery may be improved.

In example embodiments, the first and second cathode active material particles may include lithium metal oxides containing nickel, and the second cathode active material particle may have a concentration of nickel less than that of the first cathode active material particle. Accordingly, life-time and penetration stability of the lithium secondary battery may be further improved through a combination with the concentration gradient of the first cathode active material particle.

In some embodiments, a size of the second cathode active material particle may be controlled, or a coating layer may be formed on the first cathode active material particle so that life-time and penetration stability of the lithium secondary battery may be further improved.

DETAILED DESCRIPTION OF THE EMBODIMENTS

According to example embodiments of the present invention, a lithium secondary battery having improved electrical performance and mechanical stability is provided. The lithium secondary battery may include a cathode active material including a first cathode active material particle having a concentration gradient, and a second cathode active material particle having a fixed concentration profile. According to example embodiments, a method of manufacturing the lithium secondary battery or the cathode active material is also provided.

Hereinafter, the present invention will be described in detail with reference to the accompanying drawings. However, those skilled in the art will appreciate that such embodiments described with reference to the accompanying drawings are provided to further understand the spirit of the present invention and do not limit subject matters to be protected as disclosed in the detailed description and appended claims.

The terms "a first" and "a second" used herein are not intended to specify the number or the order of objects, and only used to identify different elements or objects.

Figure 1:
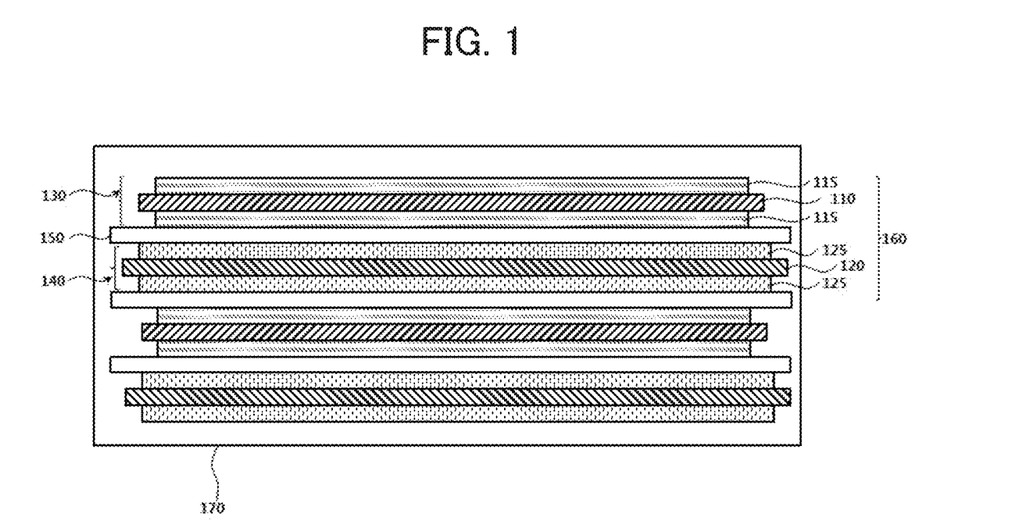
FIG. 1 is a schematic cross-sectional view illustrating a lithium secondary battery in accordance with example embodiments.

FIG. 1 is a schematic cross-sectional view illustrating a lithium secondary battery in accordance with example embodiments.

Referring to FIG. 1, a lithium secondary battery may include a cathode 130, and anode 140 and a separation layer interposed between the cathode 130 and the anode 140.

The cathode may include a cathode current collector 110 and a cathode active material layer 115 formed by coating a cathode active material on the cathode current collector 110. In example embodiments, the cathode active material may include a first cathode active material particle and a second cathode active material particle.

The first cathode active material particle may include a lithium metal oxide having a continuous concentration gradient from a central portion of the particle to a surface of the particle. In some embodiments, the first cathode active material particle may have a full concentration gradient (FCG) structure in which the concentration gradient may be substantially formed throughout the entire particle.

In some embodiments, the first cathode active material particle may include a lithium metal oxide, at least one region of which may have a continuous concentration gradient between a central portion and a surface portion. For example, the first cathode active material particle may include a concentration gradient layer formed between the central portion and the surface portion.

In some embodiments, each concentration of lithium and oxygen may be substantially fixed throughout an entire region of the particle, and at least one element except for lithium and oxygen may have the continuous concentration gradient.

The term "continuous concentration gradient" used herein may indicate a concentration profile which may be changed with a uniform trend or tendency between the central portion and the surface portion. The uniform trend may include an increasing trend or a decreasing trend.

The term "central portion" used herein may include a central point of the active material particle and may also include a region within a predetermined diameter from the central point. For example, "central portion" may encompass a region within a diameter of about 0.2 μm or about 0.1 μm from the central point of the active material particle.

The term "surface portion" used herein may include an outermost surface of the active material particle, and may also include a predetermined thickness from the outermost surface. For example, "surface portion" may include a region within a thickness of about 0.2 μm or about 0.1 μm from the outermost surface of the active material particle.

In some embodiments, the continuous concentration particle may include a linear concentration profile or a curved concentration profile. In the curved concentration profile, the concentration may change in a uniform trend without any inflection point.

In an embodiment, at least one metal except for lithium included in the first cathode active material particle may have an increasing continuous concentration gradient, and at least one metal except for lithium included in the first cathode active material particle may have an decreasing continuous concentration gradient.

In an embodiment, at least one metal included in the first cathode active material particle except for lithium may have a substantially constant concentration from the central portion to the surface.

In example embodiments, the first cathode active material particle may include a nickel-containing lithium metal oxide, and nickel may have a continuous concentration gradient throughout an entire region of the particle or in a specific region between the central portion and the surface portion. In example embodiments, a concentration (or a molar ratio) of nickel may be continuously decreased between the central portion and the surface portion in the first cathode active material particle.

In an embodiment, metals included in the first cathode active material particle except for lithium may include a first metal M1 and a second metal M2. The first metal M1 may have a continuously decreasing concentration gradient from the central portion to the surface. The second metal M2 have a continuously increasing concentration gradient from the central portion to the surface.

In an embodiment, the metals included in the first cathode active material particle except for lithium may further include a third metal M3. The third metal M3 may have a substantially constant concentration from the central portion to the surface.

The term "concentration" used herein may indicate, e.g., a molar ratio of the first to third metals.

For example, the first cathode active material particle may be represented by the following Chemical Formula 1.

$Li_xM1_aM2_bM3_cO_y$  [Chemical Formula 1]

In the Chemical Formula 1 above, M1, M2 and M3 may be selected from Ni, Co, Mn, Na, Mg, Ca, Ti, V, Cr, Cu, Zn, Ge, Sr, Ag, Ba, Zr, Nb, Mo, Al, Ga and B, and $0<x\le1.1$, $2\le y\le2.02$, $0<a<1$, $0<b<1$, $0<c<1$, and $0<a+b+c\le1$.

In some embodiments, M1, M2 and M3 of Chemical Formula 1 may be nickel (Ni), manganese (Mn) and cobalt (Co), respectively.

For example, nickel may serve as a metal related to a capacity of the lithium secondary battery. As an amount of nickel becomes higher, capacity and power of the lithium secondary battery may be improved. However, an excessive amount of nickel may degrade of a life-time property of the battery, and may be disadvantageous in an aspect of mechanical and electrical stability of the battery. For example, when the amount of nickel is excessively increased, defects such as ignition or short-circuit by a penetration of an external object may not be sufficiently suppressed.

However, according to example embodiments, nickel may be included as the first metal M1. Thus, the amount of nickel at the central portion may be relatively high to improve the capacity and power of the lithium secondary battery, and a concentration of nickel may be decreased from the central portion to the surface to prevent the defects from the penetration and a life-time reduction.

For example, manganese (Mn) may serve as a metal related to the mechanical and electrical stability of the lithium secondary battery. In example embodiments, an amount of Mn may be increased from the central portion to the surface so that the defects from the penetration such as ignition or short-circuit through the surface may be suppressed or reduced, and the life-time of the lithium secondary battery may be also enhanced.

For example, cobalt (Co) may serve as a metal related to a conductivity or a resistance of the lithium secondary battery. In example embodiments, a concentration of cobalt may be fixed or uniformly maintained through an entire region of the first cathode active material particle. Thus, a current or a charge flow through the first cathode active material particle may be uniformly maintained while improving the conductivity of the battery and maintaining low resistance.

In some embodiments, in Chemical Formula 1, the first metal M1 may be nickel, and, e.g., $0.6\le a\le 0.95$ and $0.05\le b+c\le 0.4$. For example, a concentration (or a molar ratio) of nickel may be continuously decreased from about 0.95 to about 0.6. In an embodiment, a concentration gradient layer having a concentration gradient region may be formed between the central portion and the surface portion, and the concentration (or the molar ratio) of nickel may be continuously decreased from about 0.95 to about 0.6 in the concentration gradient layer.

If a lower limit of the nickel concentration (e.g., a surface concentration) is less than about 0.6, capacity and power at the surface of the first cathode active material particle may be excessively deteriorated. If an upper limit of the nickel concentration (e.g., a central concentration) exceeds about 0.95, life-time and mechanical stability at the central portion may be excessively degraded.

Preferably, in Chemical Formula 1, $0.7\le a\le 0.9$ and $0.1\le b+c\le 0.3$. In this case, both capacity and stability of the battery may be enhanced. In an embodiment, $0.77\le a\le 0.83$, $0.07\le b\le 0.13$ and $0.07\le c\le 0.13$, preferably $0.79\le a\le 0.81$, $0.09\le b\le 0.11$ and $0.09\le c\le 0.11$.

According to example embodiments as described above, the first cathode active material particle may include the continuous concentration gradient between the central portion and the surface.

In some embodiments, the first cathode active material particle may have a FCG structure including the concentration gradient at substantially an entire region thereof. In this case, for example, a concentration of Ni may be continuously decreased from the central portion to the surface, and a concentration of Mn may be continuously increased from the central portion to the surface. A concentration of Co may be substantially constant from the central portion to the surface.

In some embodiments, the first cathode active material particle may include the concentration gradient layer at a specific region between the surface portion and the surface portion. In the concentration gradient layer, a concentration of Ni may be continuously decreased, a concentration of Mn may be continuously increased, and a concentration of Co may be substantially constant.

In this case, elements of the first cathode active material particle may have uniform compositions at the central portion and the surface portion. For example, the concentrations of Ni and Mn may be constant at each of the central portion and the surface portion. The concentration of Ni may become relatively high at the central portion, and the concentration of Mn may become relatively high at the surface portion through the concentration gradient layer. The concentration of Co may be substantially uniform or constant throughout the central portion, the concentration gradient layer and the surface portion.

In some embodiments, the first cathode active material particle may further include a coating layer on the surface thereof. For example, the coating layer may include Al, Ti, Ba, Zr, Si, B, Mg, P, an alloy thereof or on oxide thereof. These may be used alone or in a mixture thereof. The first cathode active material particle may be passivated by the coating layer so that penetration stability and life-time of the battery may be further improved.

In an embodiment, the elements, the alloy or the oxide of the coating layer may be inserted in the first cathode active material particle as dopants.

In some embodiments, the first cathode active material particle may be formed from a primary particle having a rod-type shape. An average diameter of the first cathode active material particle may be in a range from about 3 μm to about 25 μm.

The cathode active material may include a second cathode active material particle blended with the first cathode active material particle. In example embodiments, the second cathode active material particle may have a substantially constant or fixed concentration throughout an entire region of the particle.

The second cathode active material particle may include a lithium metal oxide. In example embodiments, the second cathode active material particle may include a nickel-containing lithium metal oxide. In the second cathode active material particle, a concentration of nickel may be less than that in the first cathode active material particle. In an embodiment, the concentration of nickel in the second cathode active material particle may be fixed to be less than the concentration of nickel at the surface of the first cathode active material particle.

In some embodiments, the second cathode active material particle may include at least two metals except for lithium. Concentrations of the metals except for lithium may be maintained constant from a central portion of the particle to a surface of the particle.

In some embodiments, the second cathode active material particle may include a first metal M1', a second metal M2' and a third metal M3'. For example, the first metal M1', the second metal M2' and the third metal M3' may be nickel (Ni), cobalt (Co) and manganese (Mn), respectively.

As described above, concentrations or molar ratios of Ni, Co and Mn may be uniform or constant throughout the entire region of the second cathode active material particle. In some embodiments, the second cathode active material particle may include an excess amount of nickel, and the concentrations of nickel, manganese and cobalt may become sequentially smaller in consideration of both capacity and stability of the lithium secondary battery. In example embodiments, the concentration ratio of Ni:Co:Mn in the second cathode active material particle may be substantially 5:2:3.

The term "excess amount" used herein may indicate that the metal element of the excess amount has the largest concentration or molar ratio among the metal elements except for lithium in the cathode active material particle.

For example, the second cathode active material particle may be represented by the following Chemical Formula 2.

[Chemical Formula 2]

In the Chemical Formula 2 above, M1', M2' and M3' may be selected from Ni, Co, Mn, Na, Mg, Ca, Ti, V, Cr, Cu, Zn, Ge, Sr, Ag, Ba, Zr, Nb, Mo, Al, Ga, W and B, and $0<x\leq1.1$, $2\leq y\leq2.02$ and $0<a+b+c\leq1$.

In some embodiments, in the Chemical Formula 2 above, $0.48\leq a\leq0.52$ $0.18\leq b\leq0.22$ and $0.28\leq c\leq0.32$, preferably, $0.49\leq a\leq0.51$, $0.19\leq b\leq0.21$ and $0.29\leq c\leq0.31$.

In some embodiments, as described above, the first metal M1', the second metal M2' and the third metal M3' may be Ni, Co and Mn, respectively.

In example embodiments, a thermal stability of the lithium secondary battery or the cathode may be enhanced through blending the second cathode active material particle with the first cathode active material particle. The second cathode active material particle may have a nickel concentration or a nickel molar ratio less than that of the first cathode active material particle through an entire region of the particle, and Mn may be distributed uniformly throughout the second cathode active material particle.

Thus, the ignition or explosion occurring by the penetration of the external object may be avoided, and a heat resistance may be also improved during repeated charging and discharging so that an operational uniformity and the life-time of the lithium secondary battery may be remarkably improved.

Further, a cobalt concentration may be constant through the entire region of the second cathode active material particle so that conductivity and resistance of the entire cathode may be uniformly maintained.

In some embodiments, the concentration of nickel may be greater than other metals (e.g., manganese and cobalt) in the second cathode active material particle, and the concentration of nickel in the second cathode active material particle may be less than the concentration of nickel in the first cathode active material particle. Thus, a capacity reduction due to an inclusion of the second cathode active material particle may be suppressed while improving the life-time and penetration stability of the lithium secondary battery.

In some embodiments, an average diameter ($D_{50}$) of the second cathode active material particle may be in a range from about 3 μm to about 15 μm. Within the above range, life-time and stability of the lithium secondary battery or the cathode may be improved without interfering in an electrical activity of the first cathode active material particle by the second cathode active material particle. Preferably, the average diameter ($D_{50}$) of the second cathode active material particle may be in a range from about 4.5 μm to about 15 μm.

If the average diameter ($D_{50}$) of the second cathode active material particle is less than about 3 μm, a dimension of the particle may be excessively decreased, and desired composition, activity and stability may not be realized and controlled. If the average diameter ($D_{50}$) of the second cathode active material particle exceeds about 15 μm, an excessive amount of heat may be required for a particle formation to degrade process efficiency.

In example embodiments, a mixing ratio of the first cathode active material particle and the second cathode active material particle may be, e.g., in a range from 7:3 to 1:9, preferably, from 5:5 to 1:9. Within the above range, a thermal stability improvement and a prevention of a penetration-induced ignition by the second cathode active material particle may be more effectively achieved.

The first and second cathode active material particles may be individually prepared, and then blended to obtain the cathode active material.

In a formation of the first cathode active material, metal precursor solutions having different concentrations may be prepared. The metal precursor solutions may include precursors of metals that may be included in the cathode active material. For example, the metal precursors may include halides, hydroxides, acid salts, etc., of the metals.

For example, the metal precursors may include a lithium precursor (e.g., a lithium oxide), a nickel precursor, a manganese precursor and a cobalt precursor.

In example embodiments, a first precursor solution having a target composition at the central portion (e.g., concentrations of nickel, manganese and cobalt at the central portion) and a second precursor solution having a target composition at the surface or the surface portion (e.g., concentrations of nickel, manganese and cobalt at the surface) may be each prepared.

Subsequently, the first and second precursor solution may be mixed and a precipitate may be formed by a co-precipitation method. In some embodiments, a mixing ratio may be continuously changed so that a continuous concentration gradient may be formed from the target composition at the central portion to the target composition at the surface. In some embodiments, the mixing ratio may be changed at a specific period so that a concentration gradient layer may be formed between the central portion and the surface portion. Accordingly, the precipitate may include a concentration gradient of the metals therein.

In some embodiments, a chelate agent and a basic agent (e.g., an alkaline agent) may be added while forming the precipitate. In some embodiments, the precipitate may be thermally treated, and then a lithium salt may be mixed and thermally treated again.

The second cathode active material particle may be formed by a precipitation method using a metal precursor solution having a single target composition.

In example embodiments, the first cathode active material particle and the second cathode active material particle may be blended to form the cathode active material. The cathode active material may be mixed and stirred together with a binder, a conductive additive and/or a dispersive additive in a solvent to form a slurry. The slurry may be coated on the cathode current collector 110, and pressed and dried to obtain the cathode 130.

The cathode current collector 110 may include stainless-steel, nickel, aluminum, titanium, copper or an alloy thereof. Preferably, aluminum or an alloy thereof may be used.

The binder may include an organic based binder such as a polyvinylidene fluoride-hexafluoropropylene copolymer (PVDF-co-HFP), polyvinylidenefluoride (PVDF), polyacrylonitrile, polymethylmethacrylate, etc., or an aqueous based binder such as styrene-butadiene rubber (SBR) that may be used with a thickener such as carboxymethyl cellulose (CMC).

For example, a PVDF-based binder may be used as a cathode binder. In this case, an amount of the binder for forming the cathode active material layer 115, and an amount of the first and second cathode active material particles may be relatively increased. Thus, capacity and power of the lithium secondary battery may be further improved.

The conductive additive may be added to facilitate an electron mobility between the active material particles. For example, the conductive additive may include a carbon-based material such as graphite, carbon black, graphene, carbon nanotube, etc., and/or a metal-based material such as tin, tin oxide, titanium oxide, a perovskite material such as $LaSrCoO_3$ or $LaSrMnO_3$.

In example embodiments, an electrode density of the cathode 130 may be in a range from about 3.0 g/cc to about 3.9 g/cc, preferably, from 3.2 g/cc to about 3.8 g/cc.

In example embodiments, the anode 140 may include an anode current collector 120 and an anode active material layer 125 formed by coating an anode active material on the anode current collector 120.

The anode active material may include a material that may be capable of adsorbing and ejecting lithium ions. For example, a carbon-based material such as a crystalline carbon, an amorphous carbon, a carbon complex or a carbon fiber, a lithium alloy, silicon, tin, etc., may be used. The amorphous carbon may include a hard carbon, cokes, a mesocarbon microbead (MCMB) calcinated at a temperature of 1,500° C. or less, a mesophase pitch-based carbon fiber (MPCF), ETC. The crystalline carbon may include a graphite-based material, such as natural graphite, graphitized cokes, graphitized MCMB, graphitized MPCF, etc. The lithium alloy may further include aluminum, zinc, bismuth, cadmium, antimony, silicon, lead, tin, gallium, or indium.

The anode current collector 120 may include gold, stainless-steel, nickel, aluminum, titanium, copper or an alloy thereof, preferably, may include copper or a copper alloy.

In some embodiments, the anode active material may be mixed and stirred together with a binder, a conductive additive and/or a dispersive additive in a solvent to form a slurry. The slurry may be coated on the anode current collector 120, and pressed and dried to obtain the anode 140.

The binder and the conductive additive substantially the same as or similar to those as mentioned above may be used. In some embodiments, the binder for the anode 140 may include an aqueous binder such as such as styrene-butadiene rubber (SBR) that may be used with a thickener such as carboxymethyl cellulose (CMC) so that compatibility with the carbon-based active material may be improved.

A separator 150 may be interposed between the cathode 130 and the anode 140. The separator 150 may include a porous polymer film prepared from, e.g., a polyolefin-based polymer such as an ethylene homopolymer, a propylene homopolymer, an ethylene/butene copolymer, an ethylene/hexene copolymer, an ethylene/methacrylate copolymer, or the like. The separator 150 may be also formed from a non-woven fabric including a glass fiber with a high melting point, a polyethylene terephthalate fiber, or the like.

In some embodiments, an area and/or a volume of the anode 140 (e.g., a contact area with the separator 150) may be greater than that of the cathode 130. Thus, lithium ions generated from the cathode 130 may be easily transferred to the anode 140 without loss by, e.g., precipitation or sedimentation. Therefore, the enhancement of power and stability by the combination of the first and second cathode active material particles may be effectively implemented.

In example embodiments, an electrode cell 160 may be defined by the cathode 130, the anode 140 and the separator 150, and a plurality of the electrode cells 160 may be stacked to form an electrode assembly having, e.g., a jelly roll shape.

For example, the electrode assembly may be formed by winding, laminating or folding of the separator 150.

The electrode assembly may be accommodated in an external case 170 together with an electrolyte to form the lithium secondary battery. In example embodiments, the electrolyte may include a non-aqueous electrolyte solution.

The non-aqueous electrolyte solution may include a lithium salt and an organic solvent. The lithium salt may be represented by $Li^+X^-$, and an anion of the lithium salt $X^-$ may include, e.g., $F^-$, $Cl^-$, $Br^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, $(CF_3CF_2SO_2)_2N^-$, etc.

The organic solvent may include propylene carbonate (PC), ethylene carbonate (EC), diethyl carbonate (DEC), dimethyl carbonate (DMC), ethylmethyl carbonate (EMC), methylpropyl carbonate, dipropyl carbonate, dimethyl sulfoxide, acetonitrile, dimethoxy ethane, diethoxy ethane, vinylene carbonate, sulfolane, gamma-butyrolactone, propylene sulfite, tetrahydrofuran, etc. These may be used alone or in a combination thereof.

An electrode tab may be formed from each of the cathode current collector 110 and the anode current collector 120 to extend to one end of the external case 170. The electrode tabs may be welded together with the one end of the external case 170 to form an electrode lead exposed at an outside of the external case 170.

The lithium secondary battery may be fabricated into a cylindrical shape using a can, a prismatic shape, a pouch shape, a coin shape, etc.

Hereinafter, preferred embodiments are proposed to more concretely describe the present invention. However, the following examples are only given for illustrating the present invention and those skilled in the related art will obviously understand that various alterations and modifications are possible within the scope and spirit of the present invention. Such alterations and modifications are duly included in the appended claims.

Figure 2A:
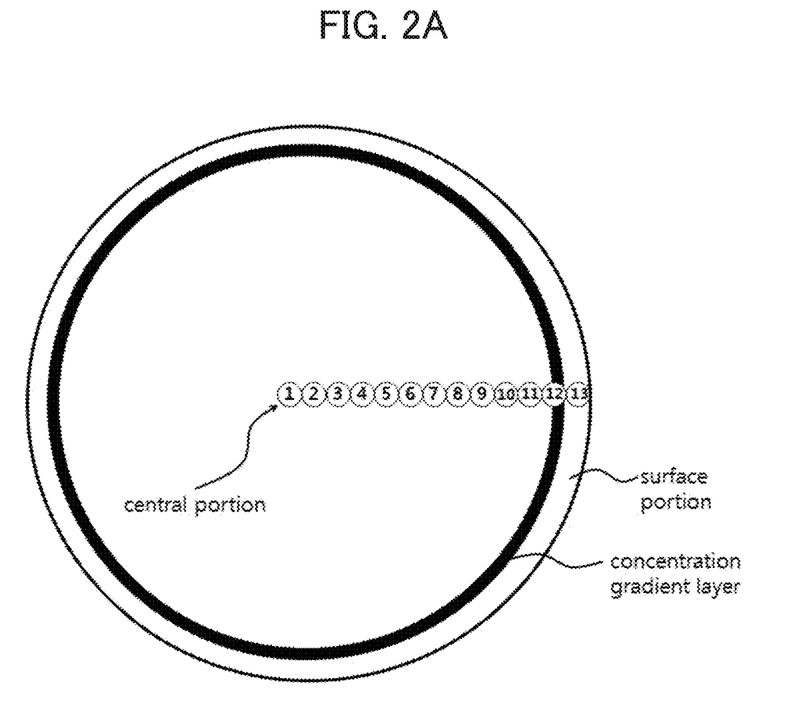
FIG. 2A is a schematic cross-sectional view illustrating positions at which a concentration gradient of a first cathode active material particle prepared in accordance with some example embodiments is measured.

Experimental Example 1: Blending a First Cathode Active Material Including a Concentration Gradient Layer in the Middle of a Particle and a Second Cathode Active Material Having a Fixed Concentration Fabrication of Lithium Secondary Battery (1) Cathode FIGS. 2A and 2B are schematic views illustrating positions at which a concentration gradient of a first cathode active material particle prepared in accordance with some example embodiments is measured.

The first cathode active material particle having a concentration gradient layer formed between a central portion and a surface portion was prepared as follows.

A lithium metal oxide (CAM10a) was used as the first cathode active material (a first lithium metal oxide). A total composition of the first lithium metal oxide was $Li_{1.0}Ni_{0.80}Co_{0.11}Mn_{0.09}O_2$, a composition at the central portion (positions numerated from 1 to 12 in Table 1 below) was $Li_{1.0}Ni_{0.802}Co_{0.11}Mn_{0.088}O_2$, and a composition at the surface portion (positions numerated from 12-5 to 13 in Table 1 below) was $Li_{1.0}Ni_{0.77}Co_{0.11}Mn_{0.12}O_2$. The concentration gradient layer was formed between the central portion and the surface portion (positions numerated from 12 to 12-4) to have a concentration gradient of nickel and manganese therein.

Figure 2B:
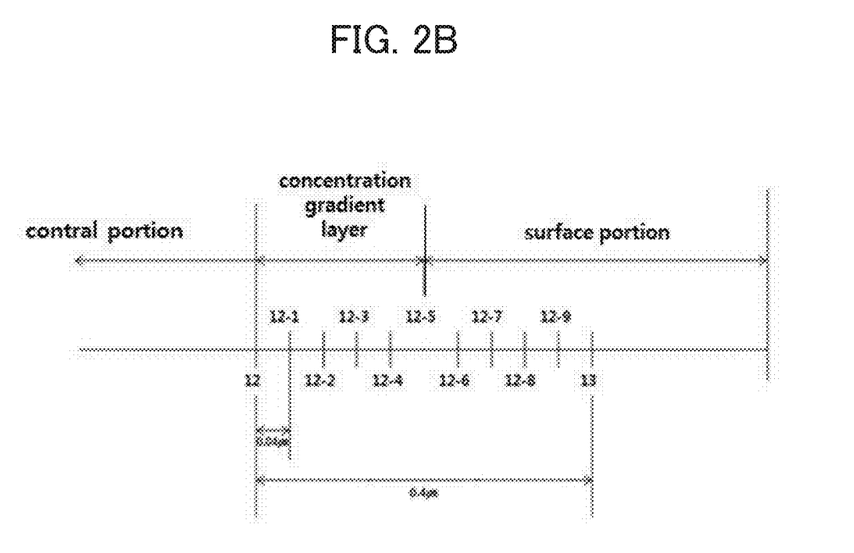
FIG. 2B is a schematic view illustrating positions at which a concentration gradient of a first cathode active material particle prepared in accordance with some example embodiments is measured.

Specifically, the concentration gradient of the first lithium metal oxide was formed as represented by Table 1 below (the concentration was measured at positions from the central portion to the surface of the first lithium metal oxide), and the position of the concentration gradient layer and the positions at which the concentrations were measured are illustrated in FIG. 2B.

In the first lithium metal oxide particle having a distance of 4.8 μm from a center and the surface, a molar ratio of each meal included in the first lithium metal oxide particle was measured at positions numbered from 1 to 12 per a distance of 0.4 μm from the center. The molar ratio of each metal was measured per a distance 0.04 μm (40 nm) at positions numbered 12-1, 12-2, 12-3, 12-4, 12-5, 12-6, 12-7, 12-8 and 12-9 between the positions numbered 12 and 13.

A second lithium metal oxide having a fixed total composition of $Li_{1.0}Ni_{1/2}Co_{1/5}Mn_{3/10}O_2$ (NCM523) was used as the second cathode active material particle. Blending ratios of the first lithium metal oxide and the second lithium metal oxide were adjusted as listed in following Tables to form cathode active materials.

Denka Black was used as a conductive additive, and PVDF was used as a binder. The cathode active material, the conductive additive and the binder were mixed by a weight ratio of 92:5:3 to form a positive electrode slurry. The positive electrode slurry was coated, dried, and pressed on an aluminum substrate to form a cathode. A density of the cathode after the pressing was 3.3 g/cc.

TABLE 1

| Position Number | Molar Ratio of Ni | Molar Ratio of Co | Molar Ratio of Mn |
|---|---|---|---|
| 1 | 0.802 | 0.110 | 0.088 |
| 2 | 0.801 | 0.111 | 0.088 |
| 3 | 0.802 | 0.110 | 0.088 |
| 4 | 0.802 | 0.110 | 0.088 |
| 5 | 0.803 | 0.111 | 0.086 |
| 6 | 0.802 | 0.110 | 0.088 |
| 7 | 0.802 | 0.110 | 0.088 |
| 8 | 0.802 | 0.109 | 0.089 |
| 9 | 0.801 | 0.110 | 0.089 |
| 10 | 0.802 | 0.110 | 0.088 |
| 11 | 0.802 | 0.108 | 0.090 |
| 12 | 0.800 | 0.110 | 0.090 |
| 12-1 | 0.794 | 0.110 | 0.096 |
| 12-2 | 0.789 | 0.109 | 0.102 |
| 12-3 | 0.782 | 0.110 | 0.108 |
| 12-4 | 0.777 | 0.110 | 0.113 |
| 12-5 | 0.770 | 0.110 | 0.120 |
| 12-6 | 0.771 | 0.110 | 0.119 |
| 12-7 | 0.770 | 0.110 | 0.120 |
| 12-8 | 0.769 | 0.111 | 0.120 |
| 12-9 | 0.770 | 0.109 | 0.121 |
| 13 | 0.770 | 0.110 | 0.120 |

(2) Anode

An anode slurry was prepared by mixing 93 wt % of a natural graphite as an anode active material, 5 wt % of a flake type conductive additive KS6, 1 wt % of SBR as a binder, and 1 wt % of CMC as a thickener. The anode slurry was coated, dried, and pressed on a copper substrate to form an anode.

(3) Lithium Secondary Battery

The cathode and the anode obtained as described above were notched with a proper size and stacked, and a separator (polyethylene, thickness: 25 μm) was interposed between the cathode and the anode to form an electrode cell. Each tab portion of the cathode and the anode was welded. The welded cathode/separator/anode assembly was inserted in a pouch, and three sides of the pouch (e.g., except for an electrolyte injection side) were sealed. The tab portions were also included in sealed portions. An electrolyte was injected through the electrolyte injection side, and then the electrolyte injection side was also sealed. Subsequently, the above structure was impregnated for more than 12 hours.

The electrolyte was prepared by dissolving 1M LiPF6 in a mixed solvent of EC/EMC/DEC (25/45/30; volume ratio), and then 1 wt % of vinylene carbonate, 0.5 wt % of 1,3-propensultone (PRS), and 0.5 wt % of lithium bis (oxalato) borate (LiBOB) were added.

The lithium secondary battery as fabricated above was pre-charged by applying a pre-charging current (2.5 A) corresponding to 0.25 C for 36 minutes. After 1 hour, the battery was degassed, aged for more than 24 hours, and then a formation charging-discharging (charging condition of CC-CV 0.2 C 4.2 V 0.05 C CUT-OFF, discharging condition CC 0.2 C 2.5 V CUT-OFF) was performed. Then, a standard charging-discharging (charging condition of CC-CV 0.5 C 4.2 V 0.05 C CUT-OFF, discharging condition CC 0.5 C 2.5 V CUT-OFF) was performed.

Examples and Comparative Examples

Figure 5:
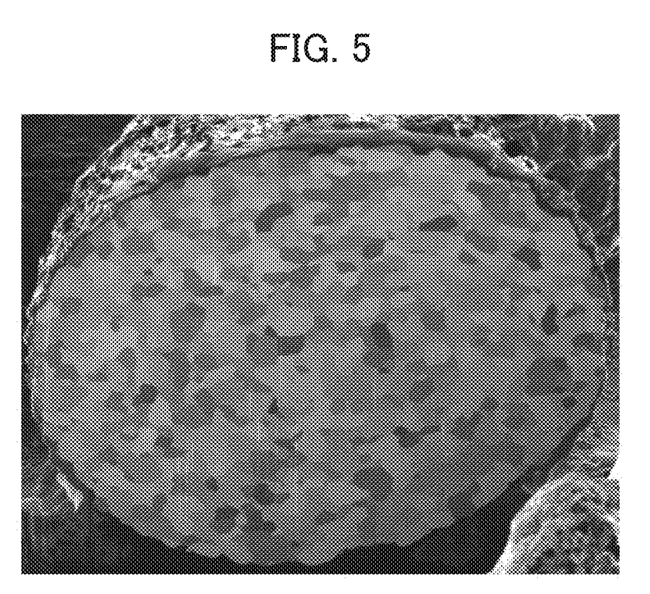
FIG. 5 is a cross-sectional image of a lithium metal oxide used in Comparative Examples.

Blends of the cathode active material particles CAM10a and NCM523 were used in Examples. $LiNi_{0.8}Co_{0.1}Mn_{0.1}O_2$ (hereinafter, referred to as CAM20 and see an image of FIG. 5) having a uniform composition throughout an entire region of the particle was used as the cathode active material in Comparative Examples.

Methods of forming the cathode, the anode and the lithium secondary battery were the same in Examples and Comparative Examples except for the cathode active material particles.

(1-1) Experimental Example 1-1: Evaluation of Life-Time and Penetration Stability Depending on Blending Ratios of NCM523 (D50: 3 μm)

The battery cells prepared as described in Table 2 below were repeatedly charged (CC-CV 2.0 C 4.2 V 0.05 C CUT-OFF) and discharged (CC 2.0 C 2.75 V CUT-OFF) 500 times, and then a discharging capacity at a 500th cycle was calculated as a percentage (%) with respect to a first cycle discharging capacity to measure the life-time property at a room temperature.

Additionally, the battery cells of Example and Comparative Examples were charged (1C 4.2V 0.1C CUT-OFF), and then the battery cells were penetrated by a nail having a diameter of 3 mm at a speed of 80 mm/sec to check whether ignition or explosion occurred (O: Ignition or explosion occurred, X: No ignition or explosion).

The results are shown in Table 2 below.

TABLE 2

| | First Lithium Metal Oxide | Second Lithium Metal Oxide ($D_{50}$: 3 μm) Blending Ratio (wt %) | Life-Time Property (500 cycle) (%) | Penetration Stability |
|---|---|---|---|---|
| Example 1-1-1 | CAM10a | 10 | 82 | O |
| Example 1-1-2 | CAM10a | 20 | 82.5 | O |
| Example 1-1-3 | CAM10a | 30 | 83.6 | O |
| Example 1-1-4 | CAM10a | 40 | 84.6 | O |
| Example 1-1-5 | CAM10a | 50 | 85.7 | X |
| Example 1-1-6 | CAM10a | 60 | 86.2 | X |
| Example 1-1-7 | CAM10a | 70 | 87.4 | X |
| Example 1-1-8 | CAM10a | 80 | 88.3 | X |
| Example 1-1-9 | CAM10a | 90 | 89.3 | X |
| Comparative Example 1-1-1 | CAM20 | 0 | 69.8 | O |
| Comparative Example 1-1-2 | CAM20 | 10 | 70.5 | O |
| Comparative Example 1-1-3 | CAM20 | 20 | 70.7 | O |
| Comparative Example 1-1-4 | CAM20 | 30 | 71.4 | O |
| Comparative Example 1-1-5 | CAM20 | 40 | 71.5 | O |
| Comparative Example 1-1-6 | CAM20 | 50 | 72 | O |
| Comparative Example 1-1-7 | CAM20 | 60 | 72.5 | O |
| Comparative Example 1-1-8 | CAM20 | 70 | 72.7 | O |
| Comparative Example 1-1-9 | CAM20 | 80 | 73.3 | O |
| Comparative Example 1-1-10 | CAM20 | 90 | 73.8 | X |
| Comparative Example 1-1-11 | CAM10a | 0 | 80.8 | O |

(1-2) Experimental Example 1-2: Evaluation of Life-Time and Penetration Stability Depending on Blending Ratios of NCM523 ($D_{50}$: 4.5 μm)

Life-time property and penetration stability of the battery cells having compositions as described in Table 3 below were evaluated by methods the same as those of Experimental Example 1-1.

TABLE 3

| | First Lithium Metal Oxide | Second Lithium Metal Oxide ($D_{50}$: 4.5 μm) Blending Ratio (wt %) | Life-Time Property (500 cycle) (%) | Penetration Stability |
|---|---|---|---|---|
| Example 1-2-1 | CAM10a | 10 | 82.1 | O |
| Example 1-2-2 | CAM10a | 20 | 82.8 | O |
| Example 1-2-3 | CAM10a | 30 | 84.2 | X |
| Example 1-2-4 | CAM10a | 40 | 84.8 | X |
| Example 1-2-5 | CAM10a | 50 | 86.3 | X |
| Example 1-2-6 | CAM10a | 60 | 87 | X |
| Example 1-2-7 | CAM10a | 70 | 87.9 | X |
| Example 1-2-8 | CAM10a | 80 | 88.8 | X |
| Example 1-2-9 | CAM10a | 90 | 90.1 | X |
| Comparative Example 1-2-1 | CAM20 | 10 | 70.7 | O |
| Comparative Example 1-2-2 | CAM20 | 20 | 70.9 | O |
| Comparative Example 1-2-3 | CAM20 | 30 | 71.5 | O |
| Comparative Example 1-2-4 | CAM20 | 40 | 71.7 | O |
| Comparative Example 1-2-5 | CAM20 | 50 | 72.4 | O |
| Comparative Example 1-2-6 | CAM20 | 60 | 72.9 | O |
| Comparative Example 1-2-7 | CAM20 | 70 | 73.3 | O |

TABLE 3-continued

| | First Lithium Metal Oxide | Second Lithium Metal Oxide ($D_{50}$: 4.5 μm) Blending Ratio (wt %) | Life-Time Property (500 cycle) (%) | Penetration Stability |
|---|---|---|---|---|
| Comparative Example 1-2-8 | CAM20 | 80 | 73.6 | ○ |
| Comparative Example 1-2-9 | CAM20 | 90 | 74 | X |

(1-3) Experimental Example 1-3: Evaluation of Life-Time and Penetration Stability Depending on Blending Ratios of NCM523 ($D_{50}$: 7 μm)

Life-time property and penetration stability of the battery cells having compositions as described in Table 4 below were evaluated by methods the same as those of Experimental Example 1-1.

TABLE 4

| | First Lithium Metal Oxide | Second Lithium Metal Oxide ($D_{50}$: 7 μm) Blending Ratio (wt %) | Life-Time Property (500 cycle) (%) | Penetration Stability |
|---|---|---|---|---|
| Example 1-3-1 | CAM10a | 10 | 82.3 | ○ |
| Example 1-3-2 | CAM10a | 20 | 83 | ○ |
| Example 1-3-3 | CAM10a | 30 | 84.2 | X |
| Example 1-3-4 | CAM10a | 40 | 85.5 | X |
| Example 1-3-5 | CAM10a | 50 | 86.7 | X |
| Example 1-3-6 | CAM10a | 60 | 87 | X |
| Example 1-3-7 | CAM10a | 70 | 88.3 | X |
| Example 1-3-8 | CAM10a | 80 | 89.5 | X |
| Example 1-3-9 | CAM10a | 90 | 90.7 | X |
| Comparative Example 1-3-1 | CAM20 | 10 | 70.4 | ○ |
| Comparative Example 1-3-2 | CAM20 | 20 | 71.1 | ○ |
| Comparative Example 1-3-3 | CAM20 | 30 | 71.7 | ○ |
| Comparative Example 1-3-4 | CAM20 | 40 | 72 | ○ |
| Comparative Example 1-3-5 | CAM20 | 50 | 72.8 | ○ |
| Comparative Example 1-3-6 | CAM20 | 60 | 73.1 | ○ |
| Comparative Example 1-3-7 | CAM20 | 70 | 73.7 | ○ |
| Comparative Example 1-3-8 | CAM20 | 80 | 74.1 | X |
| Comparative Example 1-3-9 | CAM20 | 90 | 74.4 | X |

(1-4) Experimental Example 1-4: Evaluation of Life-Time and Penetration Stability Depending on Blending Ratios of NCM523 ($D_{50}$: 10 μm)

Life-time property and penetration stability of the battery cells having compositions as described in Table 5 below were evaluated by methods the same as those of Experimental Example 1-1.

TABLE 5

| | First Lithium Metal Oxide | Second Lithium Metal Oxide ($D_{50}$: 10 μm) Blending Ratio (wt %) | Life-Time Property (500 cycle) (%) | Penetration Stability |
|---|---|---|---|---|
| Example 1-4-1 | CAM10a | 10 | 82.4 | ○ |
| Example 1-4-2 | CAM10a | 20 | 83.5 | ○ |
| Example 1-4-3 | CAM10a | 30 | 84.2 | X |
| Example 1-4-4 | CAM10a | 40 | 85.3 | X |
| Example 1-4-5 | CAM10a | 50 | 87 | X |
| Example 1-4-6 | CAM10a | 60 | 88.1 | X |
| Example 1-4-7 | CAM10a | 70 | 89 | X |
| Example 1-4-8 | CAM10a | 80 | 90.5 | X |
| Example 1-4-9 | CAM10a | 90 | 91.6 | X |
| Comparative Example 1-4-1 | CAM20 | 10 | 70.7 | ○ |
| Comparative Example 1-4-2 | CAM20 | 20 | 71.1 | ○ |
| Comparative Example 1-4-3 | CAM20 | 30 | 71.8 | ○ |
| Comparative Example 1-4-4 | CAM20 | 40 | 72 | ○ |
| Comparative Example 1-4-5 | CAM20 | 50 | 72.8 | ○ |
| Comparative Example 1-4-6 | CAM20 | 60 | 73.1 | ○ |
| Comparative Example 1-4-7 | CAM20 | 70 | 74.1 | X |
| Comparative Example 1-4-8 | CAM20 | 80 | 74.5 | X |
| Comparative Example 1-4-9 | CAM20 | 90 | 75 | X |

(1-5) Experimental Example 1-5: Evaluation of Life-Time and Penetration Stability Depending on Blending Ratios of NCM523 ($D_{50}$: 15 μm)

Life-time property and penetration stability of the battery cells having compositions as described in Table 6 below were evaluated by methods the same as those of Experimental Example 1-1.

TABLE 6

| | First Lithium Metal Oxide | Second Lithium Metal Oxide ($D_{50}$: 15 μm) Blending Ratio (wt %) | Life-Time Property (500 cycle) (%) | Penetration Stability |
|---|---|---|---|---|
| Example 1-5-1 | CAM10a | 10 | 82.5 | ○ |
| Example 1-5-2 | CAM10a | 20 | 83.5 | ○ |
| Example 1-5-3 | CAM10a | 30 | 84.4 | X |
| Example 1-5-4 | CAM10a | 40 | 85.9 | X |
| Example 1-5-5 | CAM10a | 50 | 87.4 | X |
| Example 1-5-6 | CAM10a | 60 | 88.1 | X |
| Example 1-5-7 | CAM10a | 70 | 89 | X |
| Example 1-5-8 | CAM10a | 80 | 90.5 | X |
| Example 1-5-9 | CAM10a | 90 | 92 | X |
| Comparative Example 1-5-1 | CAM20 | 10 | 70.3 | ○ |
| Comparative Example 1-5-2 | CAM20 | 20 | 71.1 | ○ |
| Comparative Example 1-5-3 | CAM20 | 30 | 71.9 | ○ |
| Comparative Example 1-5-4 | CAM20 | 40 | 72.4 | ○ |
| Comparative Example 1-5-5 | CAM20 | 50 | 72.9 | ○ |
| Comparative Example 1-5-6 | CAM20 | 60 | 73.7 | ○ |
| Comparative Example 1-5-7 | CAM20 | 70 | 74 | X |
| Comparative Example 1-5-8 | CAM20 | 80 | 75.1 | X |

TABLE 6-continued

| | First Lithium Metal Oxide | Second Lithium Metal Oxide ($D_{50}$: 15 μm) Blending Ratio (wt %) | Life-Time Property (500 cycle) (%) | Penetration Stability |
|---|---|---|---|---|
| Comparative Example 1-5-9 | CAM20 | 90 | 75.5 | X |

Referring to Tables 2 to 6 above, the batteries of Examples showed improved life-time property and penetration stability compared to those in Comparative Examples.

Regarding a particle dimension of the second lithium metal oxide ($D_{50}$), the life-time property and penetration stability were generally improved from Experimental Example 1-1 to Example 1-5.

In Examples, when the bending ratio of the first lithium metal oxide and the second lithium metal oxide was from about 50:50 to about 10:90, the penetration stability was improved in substantially entire region of $D_{50}$.

When the particle dimension of the second lithium metal oxide ($D_{50}$) was from 4.5 μm to 15 μm, the blending ratios of the first lithium metal oxide and the second lithium metal oxide in which the ignition or explosion by the penetration did not occur were widely expanded.

Figure 4:
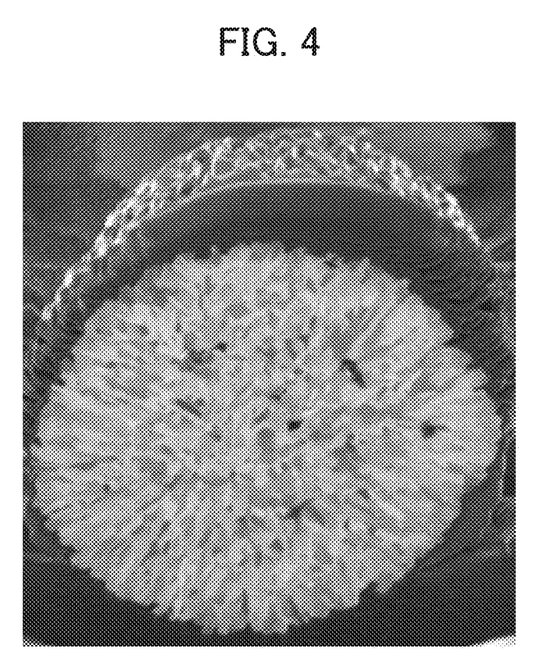
FIG. 4 is a cross-sectional image of a first cathode active material particle prepared in accordance with example embodiments.

Experimental Example 2: Blending a First Cathode Active Material Having a FCG Structure and a Second Cathode Active Material Having a Fixed Concentration Fabrication of Lithium Secondary Battery (1) Cathode A mixing ratio of precursors was continuously changed to form precipitates so that a first cathode active material particle having an entire composition of $LiNi_{0.8}Co_{0.1}Mn_{0.1}O_2$ and having a continuous concentration gradient from a central composition of $LiNi_{0.84}Co_{0.11}Mn_{0.05}O_2$ to a surface composition of $LiNi_{0.78}Co_{0.10}Mn_{0.12}O_2$ was formed (hereinafter, referred to as CAM10b and also see an image of FIG. 4). Additionally, a second cathode active material particle having uniform concentrations (or molar ratios) of nickel, manganese and cobalt from a central portion to a surface (hereinafter, referred to as NCM523) was prepared.

Blending ratios of the first and second cathode active material particles were adjusted as listed in following Tables to form cathode active materials. The cathode active material, Denka Black as a conductive additive and PVDF as a binder were mixed by a weight ratio of 92:5:3 to form a positive electrode slurry. The positive electrode slurry was coated, dried, and pressed on an aluminum collector to form a cathode. A density of the cathode after the pressing was 3.3 g/cc.

Figure 3:
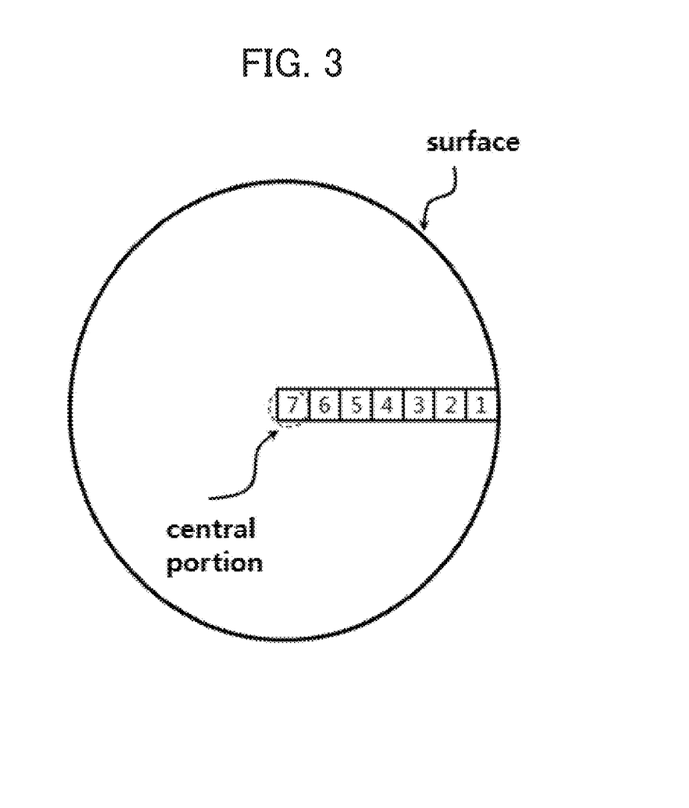
FIG. 3 is a schematic cross-sectional view illustrating positions at which a concentration gradient of a first cathode active material particle prepared in accordance with some example embodiments is measured.

FIG. 3 is a schematic cross-sectional view illustrating positions at which a concentration gradient of a first cathode active material particle prepared in accordance with some example embodiments is measured. Referring to FIG. 3, a distance from the central portion to the surface of the first cathode active material particle was 5 μm, and the concentration was measured per a distance of 5/7 μm. The results are listed in Table 7 below.

TABLE 7

| Position Number | Molar Ratio of Ni | Molar Ratio of Co | Molar Ratio of Mn |
|---|---|---|---|
| 1 | 77.97 | 10.07 | 11.96 |
| 2 | 80.98 | 9.73 | 9.29 |
| 3 | 82.68 | 10.32 | 7 |
| 4 | 82.6 | 10 | 7.4 |
| 5 | 82.55 | 10.37 | 7.07 |
| 6 | 83.24 | 10.86 | 5.9 |
| 7 | 84.33 | 10.83 | 4.84 |

(2) Anode

An anode was fabricated by a method the same as that of Experimental Example 1.

(3) Lithium Secondary Battery

A lithium secondary battery was fabricated using the cathode and the anode prepared as described above by a method the same as that of Experimental Example 1.

Examples and Comparative Examples

Blends of the cathode active material particles CAM10b and NCM523 were used in Examples. $LiNi_{0.8}Co_{0.1}Mn_{0.1}O_2$ (hereinafter, referred to as CAM20 and see an image of FIG. 5) having a uniform composition throughout an entire region of the particle was used as the cathode active material in Comparative Examples.

Methods of forming the cathode, the anode and the lithium secondary battery were the same in Examples and Comparative Examples except for the cathode active material particles.

(2-1) Experimental Example 2-1: Evaluation of Life-Time and Penetration Stability Depending on Blending Ratios of NCM523 ($D_{50}$: 3 μm)

The battery cells prepared as described in Table 8 below were repeatedly charged (1 C 4.2 V 0.1 C CUT-OFF) and discharged (1 C 3.0 V CUT-OFF) 500 times, and then a discharging capacity at a 500th cycle was calculated as a percentage (%) with respect to a first cycle discharging capacity to measure the life-time property.

Additionally, the battery cells of Example and Comparative Examples were charged (1C 4.2V 0.1C CUT-OFF), and then the battery cells were penetrated by a nail having a diameter of 3 mm at a speed of 80 mm/sec to check whether ignition or explosion occurred (O: Ignition or explosion occurred, X: No ignition or explosion).

The results are shown in Table 8 below.

TABLE 8

| | First Cathode Active Material Particle | Second Cathode Active Material Particle $D_{50}$(3 μm) NCM523 Blending Ratio (wt %) | Life-Time Property (500 cycle) (%) | Penetration Stability |
|---|---|---|---|---|
| Example 2-1-1 | CAM10b | 10 | 83.1 | O |
| Example 2-1-2 | CAM10b | 20 | 84 | O |
| Example 2-1-3 | CAM10b | 30 | 84.8 | O |
| Example 2-1-4 | CAM10b | 40 | 86.3 | O |
| Example 2-1-5 | CAM10b | 50 | 87.2 | X |
| Example 2-1-6 | CAM10b | 60 | 87.9 | X |
| Example 2-1-7 | CAM10b | 70 | 89.1 | X |
| Example 2-1-8 | CAM10b | 80 | 89.9 | X |
| Example 2-1-9 | CAM10b | 90 | 91 | X |

TABLE 8-continued

|  | First Cathode Active Material Particle | Second Cathode Active Material Particle D$_{50}$(3 μm) NCM523 Blending Ratio (wt %) | Life-Time Property (500 cycle) (%) | Penetration Stability |
|---|---|---|---|---|
| Comparative Example 2-1-1 | CAM10b | 0 | 81.8 | ○ |
| Comparative Example 2-1-2 | CAM20 | 0 | 69.8 | ○ |
| Comparative Example 2-1-3 | CAM20 | 10 | 70.5 | ○ |
| Comparative Example 2-1-4 | CAM20 | 20 | 70.7 | ○ |
| Comparative Example 2-1-5 | CAM20 | 30 | 71.4 | ○ |
| Comparative Example 2-1-6 | CAM20 | 40 | 71.5 | ○ |
| Comparative Example 2-1-7 | CAM20 | 50 | 72 | ○ |
| Comparative Example 2-1-8 | CAM20 | 60 | 72.5 | ○ |
| Comparative Example 2-1-9 | CAM20 | 70 | 72.7 | ○ |
| Comparative Example 2-1-10 | CAM20 | 80 | 73.3 | ○ |
| Comparative Example 2-1-11 | CAM20 | 90 | 73.8 | X |

(2-2) Experimental Example 2-2: Evaluation of Life-Time and Penetration Stability Depending on Blending Ratios of NCM523 (D$_{50}$: 4.5 μm)

Life-time property and penetration stability of the battery cells having compositions as described in Table 9 below were evaluated by methods the same as those of Experimental Example 2-1.

TABLE 9

|  | First Cathode Active Material Particle | Second Cathode Active Material Particle D$_{50}$(4.5 μm) NCM523 Blending Ratio (wt %) | Life-Time Property (500 cycle) (%) | Penetration Stability |
|---|---|---|---|---|
| Example 2-2-1 | CAM10b | 10 | 82.9 | ○ |
| Example 2-2-2 | CAM10b | 20 | 84.4 | ○ |
| Example 2-2-3 | CAM10b | 30 | 85 | X |
| Example 2-2-4 | CAM10b | 40 | 86.3 | X |
| Example 2-2-5 | CAM10b | 50 | 87.5 | X |
| Example 2-2-6 | CAM10b | 60 | 88.4 | X |
| Example 2-2-7 | CAM10b | 70 | 89.9 | X |
| Example 2-2-8 | CAM10b | 80 | 90.9 | X |
| Example 2-2-9 | CAM10b | 90 | 91.7 | X |
| Comparative Example 2-2-1 | CAM10b | 0 | 82.1 | ○ |
| Comparative Example 2-2-2 | CAM20 | 0 | 69.8 | ○ |
| Comparative Example 2-2-3 | CAM20 | 10 | 70.7 | ○ |
| Comparative Example 2-2-4 | CAM20 | 20 | 70.9 | ○ |
| Comparative Example 2-2-5 | CAM20 | 30 | 71.5 | ○ |
| Comparative Example 2-2-6 | CAM20 | 40 | 71.7 | ○ |
| Comparative Example 2-2-7 | CAM20 | 50 | 72.4 | ○ |
| Comparative Example 2-2-8 | CAM20 | 60 | 72.9 | ○ |
| Comparative Example 2-2-9 | CAM20 | 70 | 73.3 | ○ |
| Comparative Example 2-2-10 | CAM20 | 80 | 73.6 | ○ |
| Comparative Example 2-2-11 | CAM20 | 90 | 74 | X |

(2-3) Experimental Example 2-3: Evaluation of Life-Time and Penetration Stability Depending on Blending Ratios of NCM523 (D$_{50}$: 7 μm)

Life-time property and penetration stability of the battery cells having compositions as described in Table 10 below were evaluated by methods the same as those of Experimental Example 2-1.

TABLE 10

|  | First Cathode Active Material Particle | Second Cathode Active Material Particle D$_{50}$(7 μm) NCM523 Blending Ratio (wt %) | Life-Time Property (500 cycle) (%) | Penetration Stability |
|---|---|---|---|---|
| Example 2-3-1 | CAM10b | 10 | 83.3 | ○ |
| Example 2-3-2 | CAM10b | 20 | 84.5 | ○ |
| Example 2-3-3 | CAM10b | 30 | 85.2 | X |
| Example 2-3-4 | CAM10b | 40 | 86.7 | X |
| Example 2-3-5 | CAM10b | 50 | 87.6 | X |
| Example 2-3-6 | CAM10b | 60 | 88.9 | X |
| Example 2-3-7 | CAM10b | 70 | 90.3 | X |
| Example 2-3-8 | CAM10b | 80 | 91.1 | X |
| Example 2-3-9 | CAM10b | 90 | 92.2 | X |
| Comparative Example 2-3-1 | CAM10b | 0 | 82.2 | ○ |
| Comparative Example 2-3-2 | CAM20 | 0 | 69.8 | ○ |
| Comparative Example 2-3-3 | CAM20 | 10 | 70.4 | ○ |
| Comparative Example 2-3-4 | CAM20 | 20 | 71.1 | ○ |
| Comparative Example 2-3-5 | CAM20 | 30 | 71.7 | ○ |
| Comparative Example 2-3-6 | CAM20 | 40 | 72 | ○ |
| Comparative Example 2-3-7 | CAM20 | 50 | 72.8 | ○ |
| Comparative Example 2-3-8 | CAM20 | 60 | 73.1 | ○ |
| Comparative Example 2-3-9 | CAM20 | 70 | 73.7 | ○ |
| Comparative Example 2-3-10 | CAM20 | 80 | 74.1 | X |
| Comparative Example 2-3-11 | CAM20 | 90 | 74.4 | X |

(2-4) Experimental Example 2-4: Evaluation of Life-Time and Penetration Stability Depending on Blending Ratios of NCM523 (D$_{50}$: 10 μm)

Life-time property and penetration stability of the battery cells having compositions as described in Table 11 below were evaluated by methods the same as those of Experimental Example 2-1.

TABLE 11

| | First Cathode Active Material Particle | Second Cathode Active Material Particle $D_{50}$(10 µm) NCM523 Blending Ratio (wt %) | Life-Time Property (500 cycle) (%) | Penetration Stability |
|---|---|---|---|---|
| Example 2-4-1 | CAM10b | 10 | 83.1 | ○ |
| Example 2-4-2 | CAM10b | 20 | 84.4 | ○ |
| Example 2-4-3 | CAM10b | 30 | 85.7 | X |
| Example 2-4-4 | CAM10b | 40 | 86.9 | X |
| Example 2-4-5 | CAM10b | 50 | 88.2 | X |
| Example 2-4-6 | CAM10b | 60 | 89.6 | X |
| Example 2-4-7 | CAM10b | 70 | 90.6 | X |
| Example 2-4-8 | CAM10b | 80 | 92.1 | X |
| Example 2-4-9 | CAM10b | 90 | 93.4 | X |
| Comparative Example 2-4-1 | CAM10b | 0 | 81.8 | ○ |
| Comparative Example 2-4-2 | CAM20 | 0 | 69.8 | ○ |
| Comparative Example 2-4-3 | CAM20 | 10 | 70.7 | ○ |
| Comparative Example 2-4-4 | CAM20 | 20 | 71.1 | ○ |
| Comparative Example 2-4-5 | CAM20 | 30 | 71.8 | ○ |
| Comparative Example 2-4-6 | CAM20 | 40 | 72 | ○ |
| Comparative Example 2-4-7 | CAM20 | 50 | 72.8 | ○ |
| Comparative Example 2-4-8 | CAM20 | 60 | 73.1 | ○ |
| Comparative Example 2-4-9 | CAM20 | 70 | 74.1 | X |
| Comparative Example 2-4-10 | CAM20 | 80 | 74.5 | X |
| Comparative Example 2-4-11 | CAM20 | 90 | 75 | X |

(2-5) Experimental Example 2-5: Evaluation of Life-Time and Penetration Stability Depending on Blending Ratios of NCM523 ($D_{50}$: 15 µm)

Life-time property and penetration stability of the battery cells having compositions as described in Table 12 below were evaluated by methods the same as those of Experimental Example 2-1.

TABLE 12

| | First Cathode Active Material Particle | Second Cathode Active Material Particle $D_{50}$(15 µm) NCM523 Blending Ratio (wt %) | Life-Time Property (500 cycle) (%) | Penetration Stability |
|---|---|---|---|---|
| Example 2-5-1 | CAM10b | 10 | 83.1 | ○ |
| Example 2-5-2 | CAM10b | 20 | 84.7 | ○ |
| Example 2-5-3 | CAM10b | 30 | 86 | X |
| Example 2-5-4 | CAM10b | 40 | 87.3 | X |
| Example 2-5-5 | CAM10b | 50 | 88.6 | X |
| Example 2-5-6 | CAM10b | 60 | 89.6 | X |
| Example 2-5-7 | CAM10b | 70 | 91 | X |
| Example 2-5-8 | CAM10b | 80 | 92.3 | X |
| Example 2-5-9 | CAM10b | 90 | 93.8 | X |
| Comparative Example 2-5-1 | CAM10b | 0 | 81.9 | ○ |
| Comparative Example 2-5-2 | CAM20 | 0 | 69.8 | ○ |
| Comparative Example 2-5-3 | CAM20 | 10 | 70.3 | ○ |
| Comparative Example 2-5-4 | CAM20 | 20 | 71.1 | ○ |
| Comparative Example 2-5-5 | CAM20 | 30 | 71.9 | ○ |
| Comparative Example 2-5-6 | CAM20 | 40 | 72.4 | ○ |
| Comparative Example 2-5-7 | CAM20 | 50 | 72.9 | ○ |
| Comparative Example 2-5-8 | CAM20 | 60 | 73.7 | ○ |
| Comparative Example 2-5-9 | CAM20 | 70 | 74 | X |
| Comparative Example 2-5-10 | CAM20 | 80 | 75.1 | X |
| Comparative Example 2-5-11 | CAM20 | 90 | 75.5 | X |

Referring to Tables 8 to 12 above, the batteries of Examples using blends of the first cathode active material particle having the concentration gradient (CAM10b) and the second cathode active material particle of a fixed composition (NCM523) showed improved life-time property and penetration stability compared to those in Comparative Examples.

The battery cells of Comparative Examples showed generally degraded life-time property and penetration stability, and the ignition did not occur only when an excess of NCM523 was included.

In Examples 2-1 to 2-5, when the bending ratio of the first cathode active material particle and the second cathode active material particle was from about 50:40 to about 10:90, the ignition or explosion by the penetration did not occur.

When the particle dimension ($D_{50}$) of the second lithium metal oxide (NCM523) was from 4.5 µm to 15 µm, the blending ratios of the first cathode active material particle and the second cathode active material particle in which the ignition or explosion by the penetration did not occur were widely expanded.

What is claimed is:
1. A lithium secondary battery, comprising:
   a cathode formed from a cathode active material including a first cathode active material particle and a second cathode active material particle;
   an anode; and
   a separator interposed between the cathode and the anode,
   wherein the first cathode active material particle includes a lithium metal oxide including a continuous concentration gradient in at least one region between a central point and an outermost surface,
   wherein the first cathode active material particle contains nickel (Ni) and at least one metal except for lithium and nickel, a molar ratio or a concentration of Ni is 0.7 or more throughout an entire region of the first cathode active material particle, and a concentration of lithium is constant throughout the entire region of the first cathode active material particle, and
   wherein the second cathode active material particle includes a lithium metal oxide including at least two metals except for lithium which have constant concentrations from a central portion to a surface portion, and the second cathode active material particle includes an excess amount of nickel among the metals except for lithium.

2. The lithium secondary battery according to claim 1, wherein the first cathode active material particle includes the lithium metal oxide represented by Chemical Formula 1:

$$Li_xM1_aM2_bM3_cO_y$$ [Chemical Formula 1]

wherein, in the Chemical Formula 1 above, M1 is Ni, and M2 and M3 are selected from Co, Mn, Na, Mg, Ca, Ti, V, Cr, Cu, Zn, Ge, Sr, Ag, Ba, Zr, Nb, Mo, Al, Ga or B, $0<x\leq1.1$, $2\leq y\leq2.02$, $0.7\leq a\leq0.9$, and $0.1\leq b+c\leq0.3$.

3. The lithium secondary battery according to claim 2, wherein M2 and M3 each includes Mn and Co, respectively.

4. The lithium secondary battery according to claim 3, wherein M1 has a continuously decreasing concentration in a direction from the central point to the outermost surface, and M2 has a continuously increasing concentration in the direction from the central point to the outermost surface.

5. The lithium secondary battery according to claim 4, wherein the first cathode active material particle includes a concentration gradient layer formed between a central portion and a surface portion,
wherein the central portion of the first cathode active material particle is a region within a predetermined diameter from the central point, and the surface portion of the first cathode active material particle is a region within a predetermined thickness from the outermost surface.

6. The lithium secondary battery according to claim 5, wherein the central portion and the surface portion of the first cathode active material particle each has a constant concentration composition, and the central portion and the surface portion of the first cathode active material particle have different concentration compositions from each other.

7. The lithium secondary battery according to claim 3, wherein M3 has a constant concentration throughout an entire region from the central point to the outermost surface.

8. The lithium secondary battery according to claim 1, wherein the second cathode active material particle including a lithium metal oxide is represented by Chemical Formula 2:

$$Li_xM1'_aM2'_bM3'_cO_y$$ [Chemical Formula 2]

wherein, in the Chemical Formula 2 above, M1' is Ni, M2' and M3' are selected from Co, Mn, Na, Mg, Ca, Ti, V, Cr, Cu, Zn, Ge, Sr, Ag, Ba, Zr, Nb, Mo, Al, Ga, W or B, and
$0<x\leq1.1$, $2\leq y\leq2.02$, $0<a+b+c\leq1$, $0.48\leq a\leq0.52$ $0.18\leq b\leq0.22$ and $0.28\leq c\leq0.32$.

9. The lithium secondary battery according to claim 8, wherein $0.49\leq a\leq0.51$, $0.19\leq b\leq0.21$ and $0.29\leq c\leq0.31$ in the Chemical Formula 2.

10. The lithium secondary battery according to claim 8, wherein, in the Chemical Formula 2, M2' and M3' each includes Co and Mn, respectively.

11. The lithium secondary battery according to claim 1, wherein a blending ratio of the first cathode active material particle and the second cathode active material particle is in a range from 7:3 to 1:9.

12. The lithium secondary battery according to claim 1, wherein a blending ratio of the first cathode active material particle and the second cathode active material particle is in a range from 5:5 to 1:9.

13. The lithium secondary battery according to claim 1, an average diameter (D50) of the second cathode active material particle is in a range from 3 μm to 15 μm.

14. The lithium secondary battery according to claim 1, an average diameter (D50) of the second cathode active material particle is in a range from 4.5 μm to 15 μm.

* * * * *